(12) United States Patent
Huotari et al.

(10) Patent No.: US 7,908,643 B2
(45) Date of Patent: Mar. 15, 2011

(54) APPARATUS AND METHOD FOR SECURE CONFIGURATION OF SHARED MEDIUM DEVICES

(75) Inventors: Allen J. Huotari, Garden Grove, CA (US); Kendra S. Harrington, Irvine, CA (US); Matthew McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 963 days.

(21) Appl. No.: 11/510,449

(22) Filed: Aug. 25, 2006

(65) Prior Publication Data

US 2008/0052764 A1    Feb. 28, 2008

(51) Int. Cl.
| | |
|---|---|
| G06F 7/04 | (2006.01) |
| H04L 29/06 | (2006.01) |
| H04W 4/00 | (2009.01) |
| G06F 21/00 | (2006.01) |
| H02J 1/00 | (2006.01) |
| H04Q 1/02 | (2006.01) |
| H04L 12/66 | (2006.01) |
| G06F 15/16 | (2006.01) |

(52) U.S. Cl. ............. 726/3; 713/150; 713/153; 370/338
(58) Field of Classification Search ...... 726/3; 713/150, 713/153; 370/338
See application file for complete search history.

(56) References Cited

U.S. PATENT DOCUMENTS 6,889,321 B1 * 5/2005 Kung et al. ............. 713/153
2007/0115898 A1 * 5/2007 Stein ........................ 370/338

FOREIGN PATENT DOCUMENTS

WO    WO 2005039133 A1 *    4/2005

OTHER PUBLICATIONS

Raya, M.; Aad, I.; Hubaux, J.-P.; El Fawal, A.; "Domino: Detecting MAC Layer Greedy Behavior in IEEE 802.11 Hotspots", Mobile Computing, IEEE Transactions on vol. 5, Issue: 12, Digital Object Identifier: 10.1109/TMC.2006.183, Publication Year: Dec. 2006, pp. 1691-1705.*

* cited by examiner

Primary Examiner — Matthew B Smithers
Assistant Examiner — Courtney D Fields
(74) Attorney, Agent, or Firm — Haynes and Boone, LLP.

(57) ABSTRACT

An UNENROLLED adapter responds to an enrollment activation signal by generating an enrollment supplicant signal. The enrollment supplicant signal is received by an ENROLLED adapter, an enrollment provider, which responds by formulating and transmitting an enrollment provider signal, including security management service information, to the UNENROLLED adapter. The UNENROLLED adapter changes a network adapter configuration responsive to the security management service information provided by the ENROLLED adapter, by which the network adapter is configured securely, and secure communications are effectuated. Enrolled adapter can solicit enrollment of an UNENROLLED adapter. The activation signal can be a physical or virtual activation sequence.

20 Claims, 2 Drawing Sheets

APPARATUS AND METHOD FOR SECURE CONFIGURATION OF SHARED MEDIUM DEVICES

CROSS-REFERENCE TO RELATED APPLICATIONS

This U.S. Patent Application is related to co-pending, co-assigned, U.S. patent application Ser. No. 11/510,406, entitled, "APPARATUS AND METHOD FOR SECURE CONFIGURATION OF SHARED POWERLINE DEVICES," filed on Aug. 25, 2006, which U.S. Patent Application is incorporated herein in its entirety; and to co-pending, co-assigned, U.S. patent application Ser. No. 11/510,159, entitled, "RANGE CONFINED COMMUNICATION APPARATUS AND METHOD," filed on Aug. 25, 2006, which U.S. Patent Application also is incorporated herein in its entirety.

TECHNICAL FIELD

The present invention relates to network security apparatus and methods and, in particular, to network adapters and methods providing a secure setup for shared physical medium devices.

BACKGROUND

As the convergence of universal communications and ubiquitous computing pervades daily life, new networking architectures are evolving to meet a myriad of applications. Some architectures address desires for home appliance and utility automation, control, telemetry, and security. Others are designed to offer convenient, unified remote management of distributed personal audiovisual equipment. Still others describe hardware and protocols intended to deliver broadband content to a destination (e.g., a home) using existing commercial and public transmission networks. Yet others provide a simple shared services network infrastructure using the existing access points, conduits, and wiring available within many modern homes and offices.

A shared services network is one that is capable of providing disparate services using the same transmission medium, and that may be coupled to selected existing commercial and public transmission networks. Exemplary shared services network infrastructures include, without limitation, wireline telephony, electrical power utility, and cable-access services infrastructures. These latter architectures may be designed from the perspective of a consumer, where reliability, transparency, thriftiness, and simplicity, of installation, use, and upkeep (in the aggregate, "user-friendliness") are among the most significant considerations in adoption of technology. Beneficially, many wireline and wireless architectures, devices, and protocols are converging to allow some degree of interoperability among networks intended for consumer home, or small office/home office environments (collectively, "end-point networks" or EPNs). An architectural commonality of EPNs is the shared signal transmission medium (i.e., shared medium). In a shared medium network, all communication devices share the multiple access transmission medium, but only one device can drive the network at a time. A shared services network can be a type of shared medium network.

Although convenient, shared medium architectures also share vulnerability to eavesdropping and compromise, leaving attached devices exposed to unauthorized access, misuse, and tampering (collectively, intrusion). Unfortunately, no unified, standard security implementation has been devised to protect every network in every environment, and security mechanisms effective in one environment for one type of shared medium network, may offer little protection to other implementations. In practical use, traditional network security mechanisms, such as usernames and passwords, can be cumbersome to implement and manage in an EPN. In addition, the use of passwords and keys can be unwieldy when authenticating headless devices, that is, devices that lack user interface components or peripherals. Despite the simplifications that current existing network security methods and apparatus may bring to the consumer network user, even "easy" mechanisms may require multiple steps, out-of-band security password or key transfers and, unfortunately, significant user interaction.

Oftentimes, EPN users elect not to activate beneficial security services that may be available with selected EPN devices because the security implementation process may be too cumbersome or too inconvenient for the average EPN user, even those processes are thought to be "simplified." For example, a simplified, "two-button" security activation process, available with selected networking products, may require more interaction than is desirable to a user. A home-networking user can press a button on an authenticating device (AD) to initiate an existing security activation process, in which the AD is activated to be available to connect with a supplicant device (SD) for a defined availability period. During at least a portion of this security activation process, the AD may operate in an open, unsecured mode, and be vulnerable to intrusion by rogue or network-hopping devices. While the AD is activated and available, the home-networking user also activates the SD interface, placing the SD in a search mode, possibly for a limited time.

During the SD activation period, both the AP and the SD are available for a limited period. Over the limited span of this opportunity window, the SD is expected to locate the AD, and the AD is expected to identify the SD and to determine whether the SD is an "approved" device. During the opportunity window, at least one of the AD and the SD may communicate using a non-secure or partially-secure handshake, thereby becoming vulnerable to intrusion. Once the AD identifies the SD as an approved device, the AP then transmits security information to the SD over the open, unsecure communication channel of the shared transmission medium. In response to the security information from the AD, the SD then may initiate a more secure form of communication between itself and the AD, by exchanging security and configuration information, so long as the opportunity window remains open. Otherwise, the exchange of information is incomplete, the devices cannot establish a secure communication link, and the security activation attempt fails. Typically, an EPN user would repeat this standard "two-button" method until a secure communication link was established successfully between the AD and the SD. Each repetition, however, raises the intrusion exposure of the AD and the SD. To reduce this risk, one solution may be to further limit the common availability period of one or both of the AD and the SD. However, reducing the security activation opportunity window tends to increase the likelihood of security activation failure.

Thus, the apparent simplicity of this existing security management technique can be deceptive, because the limited opportunity window may not provide sufficient time to complete the intended security management task, security management may be insufficient to complete the task and one or both devices may time out. In this scenario, the user repeats the foregoing "two-button" technique, with the hope that a secure communication link between AD and client can be made prior to another time out. In addition, it is possible that a rogue supplicant may communicate with the AD during this opportunity window period, which may interfere intentionally with successful completion of the attempted security operation. Also, devices from adjacent networks may engage in "network hopping" and attempt to link to the soliciting AD. Moreover, even if this security activation can be accomplished without time-outs, interference, or subversion by rogue opportunists or network-hoppers, the network operator typically repeats the same "two-button" security activation technique for each client adapter being attached to the associated EPN.

Despite being a simplification of previous techniques to establish secure communication, the repetitive nature of this "two-button" technique can be burdensome. For example, the "two-button" sequence is repeated, for example, each time the network topology is reconfigured, or when a device leaves a network. With even a modest number of devices connectable to a network, the current "two-button" technique may be quite inefficient. For example, in order to add six devices to a network using a current "two-button" technique, a user may be required to repeat a security activation process six times, and to make at least twelve properly-sequenced activation process steps. A "two-button" security activation technique may be cumbersome to the point of being impractical, as may be in the case of AD or SD that are disposed in inconvenient or dangerous locations within a networked premises (e.g., in an attic or crawl space, or behind a large appliance or fixture). For shared services, shared medium (S3M) networks, physical ports coupled to the S3M network are frequently disposed at or near floor level, or are otherwise positioned for easy access to the shared services conveyed by the shared medium, with exemplary physical ports of this type including electrical power wall outlets, or telephone wall connectors. Also, headless devices, lacking a graphical user interface, frequently are so configured because they may be disposed in inconvenient or inaccessible locations.

A typical consumer user may be dissuaded from enjoying the benefits of AN EPN, because the aforementioned security burdens lack sufficient "user-friendliness" to be desirable, despite the daunting risks posed by an unsecured EPN operation. It is desirable, therefore, to provide methods and apparatus for simplifying network security deployment and use, including in an S3M network, thereby encouraging consumers to benefit from the use of a secure end-point networks.

DETAILED DESCRIPTION

Embodiments according to the present invention provide methods and apparatus for simplifying security deployment over a shared services, shared medium (S3M) end-point network (EPN) disposed in an end-user facility ("premises") for the purpose of receiving end-point services. In general, the term EPN signifies one or more interoperable, shared medium, multiple-access network(s), as well as a heterogeneous system of such networks. Within this context, the terms network and subnetwork also may be used herein interchangeably, because a constituent subnetwork of an EPN may be deemed to be a network when viewed alone. In addition, an EPN can include therein at least one shared services, shared medium (S3M) network. Thus, an EPN can possess attributes of shared medium networks and shared services networks, and constituent elements may be coupled by at least one of wireline or wireless transmission media. A premises is an end-user environment such as a home, a home office, or a facility of limited size in business, industry, academia, or public administration. Without loss of generality, the term EPN can be synonymous with the terms "home network," or "small office/home office" (SOHO) network. End-point services can include public utility and commercial services capable of being delivered to a premises. These services can be delivered to the premises by guided media (e.g., copper wire lines, coaxial cable lines, fiber optic lines, and utility piping) as well as by unguided media (e.g., wireless services communicated via radiated electromagnetic energy such as radio signals). Exemplary utility services include electrical power and public telephony services. Exemplary commercial services include CATV (cable) and digital services delivered by guided media or unguided media, whether under subscription or by public broadcast.

Figure 1:
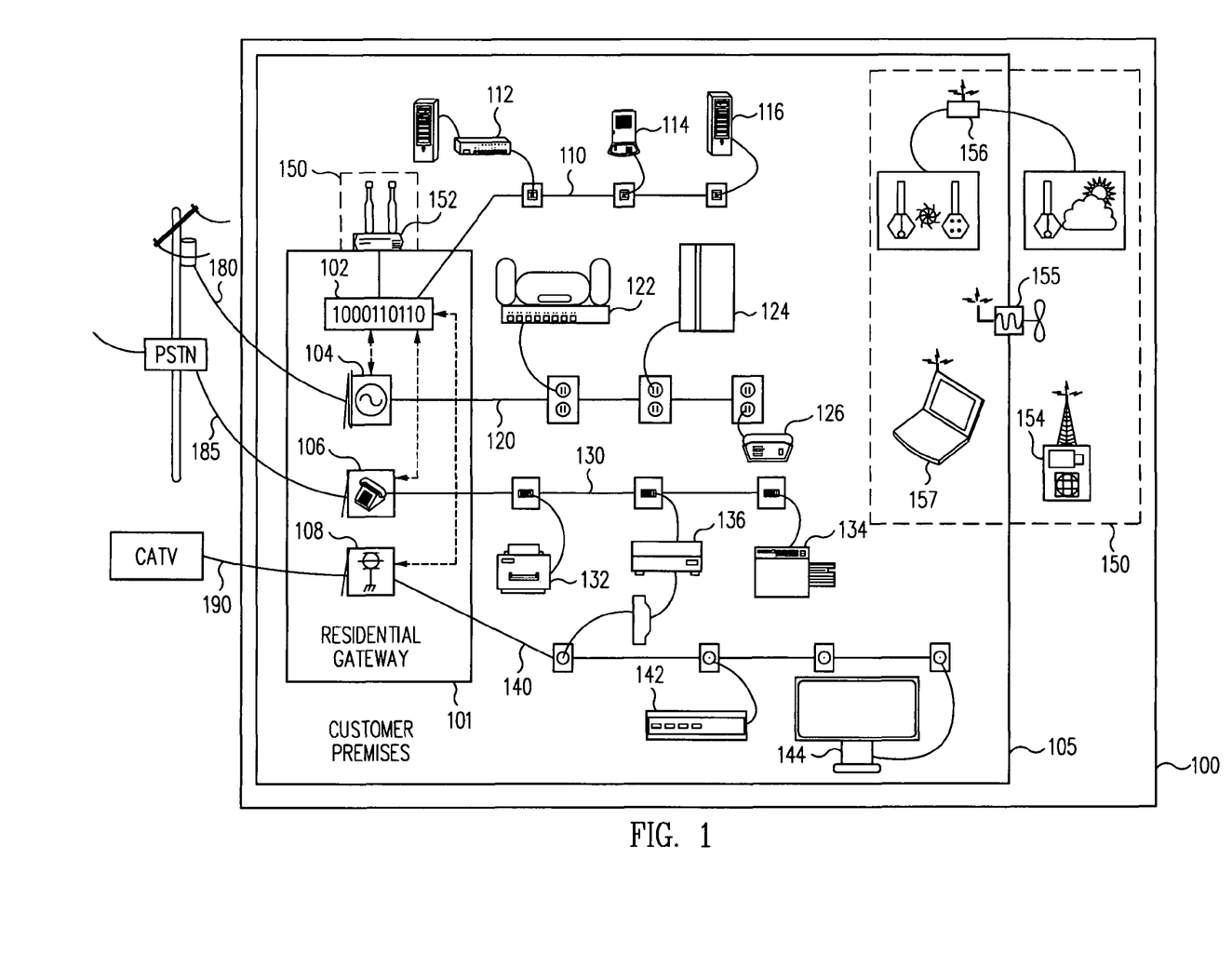
FIG. 1 is a diagrammatic representation of a heterogeneous EPN including constituent end-point shared services, shared medium networks configured according to embodiments of the present invention.

Within the context of the foregoing, FIG. 1 illustrates home network EPN 100, which operates within a defined region, including customer premises 105. Home network 100 is a heterogeneous EPN with constituent wireline and wireless end-point networks, including, Ethernet EPN (EEPN) 110; powerline network (PEPN) 120; phoneline network (TEPN) 130; and cable network (CEPN) 140. Wireless local area network (WLAN) 150 can be a constituent EPN of EPN 100, and coupled to (EEPN) 110, for example, by way of wireless access point WAP 152.

In general, each of EEPN 110, PEPN 120, TEPN 130, CEPN 140, and WLAN 150 are considered to be shared medium networks, because networked devices connected to a respective EPN share use of the medium to communicate among themselves. However, each of PEPN 120, TEPN 130, and CEPN 140 also may be designated as a shared services, shared medium (S3M) network, because the shared medium can provide a second service apart from a networking service. For example, PEPN 120 is configured to provide electrical power services concurrently with networking services over the shared medium of PEPN 120. The shared medium of PEPN 120 is, for the most part, the installed structural electrical wiring in premises 105, typically two wires disposed in parallel. Similarly, TEPN 130 is configured to provide telephone services concurrently with networking services, over the shared medium of TEPN 120. The shared medium of TEPN 130 is, for the most part, the installed structural telephone wiring in premises 105, typically at least one pair of wires, which may be a twisted pair. Also, CEPN 140 is configured to provide cable access services concurrently with high-speed networking services, over the shared medium of CEPN 140. The shared medium of CEPN 140 is, for the most part, the installed cable access services wiring in premises 105, which may be a coaxial cable. Conveniently, an S3M network can have limited extensibility using, for example, familiar, inexpensive, and readily available extension cords, patch cables, etc.

Thus, S3M networks may provide significant flexibility and versatility to an EPN operator seeking to form, expand, or reconfigure any part of EPN 100, and to widely deploy networked devices throughout premises 105. Advantageously, the inventive embodiments herein offer greater simplicity in configuring networked devices and in deploying security management services among networked devices on a shared medium network, including S3M networks.

In general, a network is formed when two or more networked devices connect to a shared medium network, e.g., shared medium networks 110 and 150, and S3M networks 120, 130, and 140. As used herein, the term networked device can include a client adapter connectable to an EPN, as well as to a host device, which is coupled to and may communicate through a client adapter with another host device or client adapter. A client adapter may be integrated physically with a host device, or may be provided as an adapter element configured to couple with the respective host device. Within the context of FIG. 1, PEPN 120 is an exemplary S3M EPN, capable of locally implementing security and configuration functions, that conducts electrical power from public utility electrical transmission medium 180 to a host device that is coupled to an S3M client adapter. The electrical power wiring forming the shared medium of PEPN 120 serves as a networking services interconnection among home entertainment system S3M client adapter 122, refrigerator/freezer unit S3M client adapter 124, and premises manager S3M client adapter 126, and as a conduit of electrical power for the respective host devices to which client adapters 122, 124, 126 are connected. S3M client adapters 122, 124, and 126 can be configured to communicate over PEPN 120. PEPN 120 is representative of a powerline network, which can be implemented in accordance with any one of the several powerline specifications and standards, whether in draft, proposed, adopted, published, or review form. For convenience of illustration only, PEPN 120 is described within the context of Broadband over Powerline (BPL) specification and standards (in the aggregate, "HomePlug™ standards"), promulgated by the HomePlug™ Powerline Alliance, San Ramon, Calif., USA. However, inventive embodiments are in no way limited thereto. Existing networked devices, including HomePlug™-configured client adapters, can be added to PEPN 120 using conventional configuration and security activation techniques, including the aforementioned conventional "two-button" security activation method. Similar two-button security activation techniques also are available for networked devices configured to use the respective shared medium of EEPN 110, TEPN 130, CEPN 140, and WLAN 150.

In contrast, in accordance with the teachings of the present invention, embodiments of shared medium client adapters 122, 124, 126 may establish configuration and security management services using a predetermined enrollment technique. The predetermined enrollment technique can be invoked by a selected single action by an operator of PEPN 120. One non-limiting example of a selected single action includes one press of a client adapter interface button. Another non-limiting example is exemplified by issuing a single user interface command to a client adapter interface over a network. Yet another non-limiting example includes effecting a state change of client adapter 122, 124, 126, for example, by cycling (OFF/ON) electrical power energizing client adapter 122, 124, 126, or the host device connected thereto.

In general, the selected single action evokes an activation command/response communication exchange between first and second client adapter 122, 124, 126. If the exchange is successful, then the communicating adapters exchange a selected enrollment signals by which security management services are negotiated and provided securely. Conveniently, client adapter 122, 124, 126 can be disposed in an UNENROLLED status or an ENROLLED status. A client adapter 122, 124, 126 may be designated with an UNENROLLED status, for example, if client adapter 122, 124, 126 is "new" to PEPN 120, that is, the UNENROLLED client adapter 122, 124, 126 has not achieved a prior successful enrollment on PEPN 120. By comparison, an ENROLLED client adapter 122, 124, 126 has achieved a prior successful enrollment on PEPN 120, and may be seeking to rejoin PEPN 120, as may happen as a result of rearranging the physical placement of client adapter 122, 124, 126 to a different position in premises 105. Thus, when so configured, client adapter 122, 124, 126, and the respective host device attached thereto, may be configured as a headless network device and disposed in a difficult or inconvenient location of premises 105, e.g., a crawl space, yet be capable of seeking activation and enrolling in secure communications over PEPN 120, with minimal interaction by the user of PEPN 120, who otherwise may lack the technical savvy to implement conventional configuration and security activation schemes.

In accordance with the inventive embodiments herein, one or more of S3M client adapters 122, 124, and 126 can be configured to employ S3M security and configuration services as one or both of an authenticating device (AD) or a supplicant device (SD). Typically, an AD bears an ENROLLED status, and is an activated networked device authorized to communicate with other networked devices on PEPN 120. When an AD is configured by security management services to use encrypted signals on PEPN 120, an AD may retain a security elements such as a secret key, hash, or passcode used during encryption. An AD also may exchange the security element with another AD, or with an SD as part of the authorization process. In general, an AD is configured to discover and be discovered, and to access, interrogate, recognize, authenticate, and exchange security and configuration information with, other S3M client adapters connected to PEPN 120. Similarly, an SD is configured to discover and be discovered, to allow access, respond, supply identifying credentials, cooperate with authentication, and exchange security and configuration information, with an AD.

Also, an UNENROLLED networked device is an unauthorized device (UD). An UD can be a networked device, including client adapter 122, 124, 126, from a different constituent EPN (e.g., EEPN 110, TEPN 130, CEPN 140, or WLAN 150), a networked device exhibiting an incompatibility with AD on PEPN 120, an unapproved networked device, or an intruding rogue or network-hopping device. It may be convenient to configure an AD on PEPN 120 to be configured to recognize a UD or, alternatively, to manage and retain a list of approved networked device indicia. Also, an AD may have a list of approved networked device indicia, as well as a list of indicia indicating known unauthorized, or blocked, devices. An AD may distribute UD indicia to other AD on PEPN 120, in accordance with a security management service security policy. In general, it is advantageous to configure an AD to ignore or reject signals emanating from UD, thus fostering the integrity of secure communications on PEPN 120.

Desirably, an AD may communicate with UNENROLLED networked device that is not a UD, i.e., an SD. For example, an UNENROLLED, approved networked device, may be one yet to be enrolled or authenticated, or be one that previously was ENROLLED, but became UNENROLLED such as by a change of state or location, or by a change in security management service security policy. Exemplary of the former type of UNENROLLED networked device is a newly purchased, uninstalled host device having an adapter similar to client adapter 122, 124, 126. Examples of a previously ENROLLED device include client adapters 122, 124, 126 that experienced a momentary power loss or non-catastrophic host device failure, that were relocated to a different position within PEPN 120, or that uses an older version of programmed code which, after updating, allows the device to again become ENROLLED.

ENROLLED S3M client adapters 122, 124, and 126, can reject or ignore signals communicated by UD over PEPN 120, thereby increasing the degree of security afforded PEPN 120 and lessening the likelihood of intrusion by a rogue or network-hopping device. An SD may communicate a discovery signal on PEPN 120, as an authorization request, seeking to be discovered, recognized, and authenticated by an AD, and thus an authorized device on PEPN 120. Similarly, an AD may communicate a discovery signal on PEPN 120, soliciting unauthorized devices to seek authentication. However, because open solicitation by an AD may provide information that facilitates intrusion, it may be desirable to configure S3M client adapters 122, 124, and 126, to communicate a discovery signal, i.e., an authorization request, when operating as an unauthorized SD, but not to communicate a discovery signal, i.e., an authorization solicitation, when operating as an authorized AD. Alternatively, AD authorization solicitation may be desirable in implementations where a previously authorized S3M client adapter, or a networked device, including a newly connected S3M client adapter, responds to the AD the solicitation with an acceptable response code or passcode. Furthermore, when S3M client adapters 122, 124, and 126, are implemented to operate in plural selectable modes of operation, it may be desirable to configure to perform an AD authorization solicitation when operating in a first mode of operation, and to perform an SD authorization request when operating in a second mode of operation.

Desirably, at least one of S3M client adapters 122, 124, and 126, is configured to provide at least one of a security setup S3M security management service, or an adapter configuration S3M security management service. Security setup S3M security management service may include, without limitation, functions effecting client adapter identification and authorization, and exchanging security information, such as a security key, to establish secure communications during other modes of operation. Adapter configuration S3M security management service may include, without limitation, any negotiation, assignment, or exchange, of at least one of port, network address, protocol information; location awareness determination; adapter priority assignment; configuration of adapter operating, performance, and power management parameters; and host device-specific information.

For the most part, an SD is an UNENROLLED client adapter, such as client adapter 122, 124, 126, which are not UD, but which exchange signals accepted by an AD for the purpose of being authenticating the SD as an authorized device on PEPN 120. ENROLLMENT generally encompasses communicating a discovery signal, performing SD identification and authentication by an AD, operating at least one of an adapter configuration S3M security management service and a security setup security management service. In general, enrollment includes an exchange of enrollment credentials—an SD is an enrollment supplicant that transmits an enrollment supplicant signal (ESS) across the medium of PEPN 120 to the AD, which is the enrollment provider. A receiving AD evaluates the supplicant credentials in the ESS and, if the AD determines to proceed with enrollment, transmits an enrollment provider signal (EPS) to the UNENROLLED SD. The EPS can include at least one of adapter configuration security management service information and security setup security management service information. There may be one exchange, or a series of exchanges, made between the enrollment supplicant and the enrollment provider. Conveniently, the UNENROLLED SD can respond to the EPS by configuring itself in accordance with adapter configuration and security setup communicated by the AD in the EPS, and by asserting its status as an ENROLLED client adapter 122, 124, 126. As noted previously, a security management service policy may permit this recently ENROLLED client adapter 122, 124, 126 to be identified as an AD on PEPN 120. It is desirable to dispose client adapters 122, 124, 126 such that a previously ENROLLED SD, seeking to be ENROLLED and authorized to communicated on PEPN 120, is granted ENROLLED status expeditiously.

Adapter configuration S3M security management service may be used to establish a defined adjacency, or neighborhood, among S3M client adapters 122, 124, and 126, on PEPN 120. An S3M client adapter disposed in a defined neighborhood may be designated as a neighbor to other S3M client adapters disposed in that neighborhood. Within the context of FIG. 1, S3M client adapters 122, 124, and 126 may form a neighborhood when electrically coupled to electrical outlets 127, 128, and 129. It may be advantageous to include neighborhood information with the signals exchanged during enrollment.

During enrollment, information regarding neighborhood and neighbors may be determined, negotiated, exchanged and retained among ENROLLED S3M client adapters, for example, to be used when S3M client adapters 122, 124, and 126 are later disposed, spaced apart, in their neighborhood. For example, as the enrollment provider, an AD may inform the enrollment supplicant SD of the bounds of the neighborhood in which the SD may communicate, once ENROLLED. Also, the enrollment provider may offer information to the enrollment supplicant regarding other ADs that may co-exist in the neighborhood or that may perform specific security management services. The enrollment supplicant may be notified to conform to neighborhood operational and performance policies. The enrollment supplicant also may be given a secret identity token to be stored securely and produced as may be needed, for example, to implement expeditious re-enrollment.

Thus, according to the foregoing S3M security management principles, a neighborhood can be a portion of PEPN 120, that includes at least one networked device which may be ENROLLED as an authenticating neighbor (AN), or which may UNENROLLED as a supplicant neighbor (SN). In the context of a neighborhood, an UD becomes an unauthorized neighbor (UN). In selected implementations, it may be desirable to employ a security management service policy granting ENROLLED status to a networked device connected in a corresponding defined neighborhood. Here, a client adapter 122, 124, 126 may be ENROLLED and serving as an AN in one neighborhood, but may be identified as UNENROLLED in a different neighborhood. Conveniently, a security management service policy may permit an AN to seek ENROLLMENT as an SN in another neighborhood, and may employ a secret identity token to expedite enrollment. In general, an AN may accept signals communicated by other AN but, apart from receiving an authorization request discovery signal from an SN, may reject or ignoring signals from UN. In selected embodiments, an AN may ignore an authorization request discovery signal from an SN. In certain embodiments, it may be advantageous to configure an AN to provide a selected S3M security management service to a SN in a most proximate presence (nearest neighbor) mode, or in a definable proximate presence (k-neighbor) mode, for example, where the SN communicates an authorization request including a secret identity token, which may have been exchanged during a previous enrollment, or provided by an S3M client adapter manufacturer or vendor as a secret key.

Furthermore, it may be advantageous to include in S3M client adapters 122, 124, 126, a storage device (not shown), for example, nonvolatile memory, which may be used to store S3M security management service information, relative to the respective S3M client adapter 122, 124, 126, as well as to store S3M security management service information, relative to other S3M client adapters which may have been piggybacked to S3M client adapter 122, 124, or 126. Retention of S3M security management service information may be useful, for example, when returning all or part of PEPN 120 to service, as well as during configuration changes to PEPN 120. This feature also is advantageous because it provides a robust, distributed retained network memory of selected S3M security management service information, a form of tribal knowledge for PEPN 120, thereby relieving the EPN operator of the burden of taking additional security steps whenever there is a change in the configuration of PEPN 120.

Also, one or more of S3M client adapters 122, 124, 126 may be configured with a user interface, providing one or both of a manually-actuated security management service actuator (not shown), and a perceptible indication of adapter configuration (not shown). A convenient manually-actuated security management service actuator can be exemplified by a button, a switch, or a lever, disposed to be accessible to an EPN operator. Simple but effective exemplary adapter indicators may include, for example, one or both of a visual annunciator, such as an illuminable LED, or an aural annunciator, such as an audible tone emitter. Desirably, the perceptible indication produced by the adapter indicator confirms to an EPN operator the successful setup and configuration of the respective S3M client adapter 122, 124, 126. In the alternative, setup of security and configuration information may be limited to a predefined configuration period, after which an EPN operator may assume that the selected S3M client adapter 122, 124, 126 has been configured. Perceptible indications may add a modicum of "user-friendliness" to an EPN operator, for example, during the course of installing and configuring headless devices and adapters.

Figure 2:
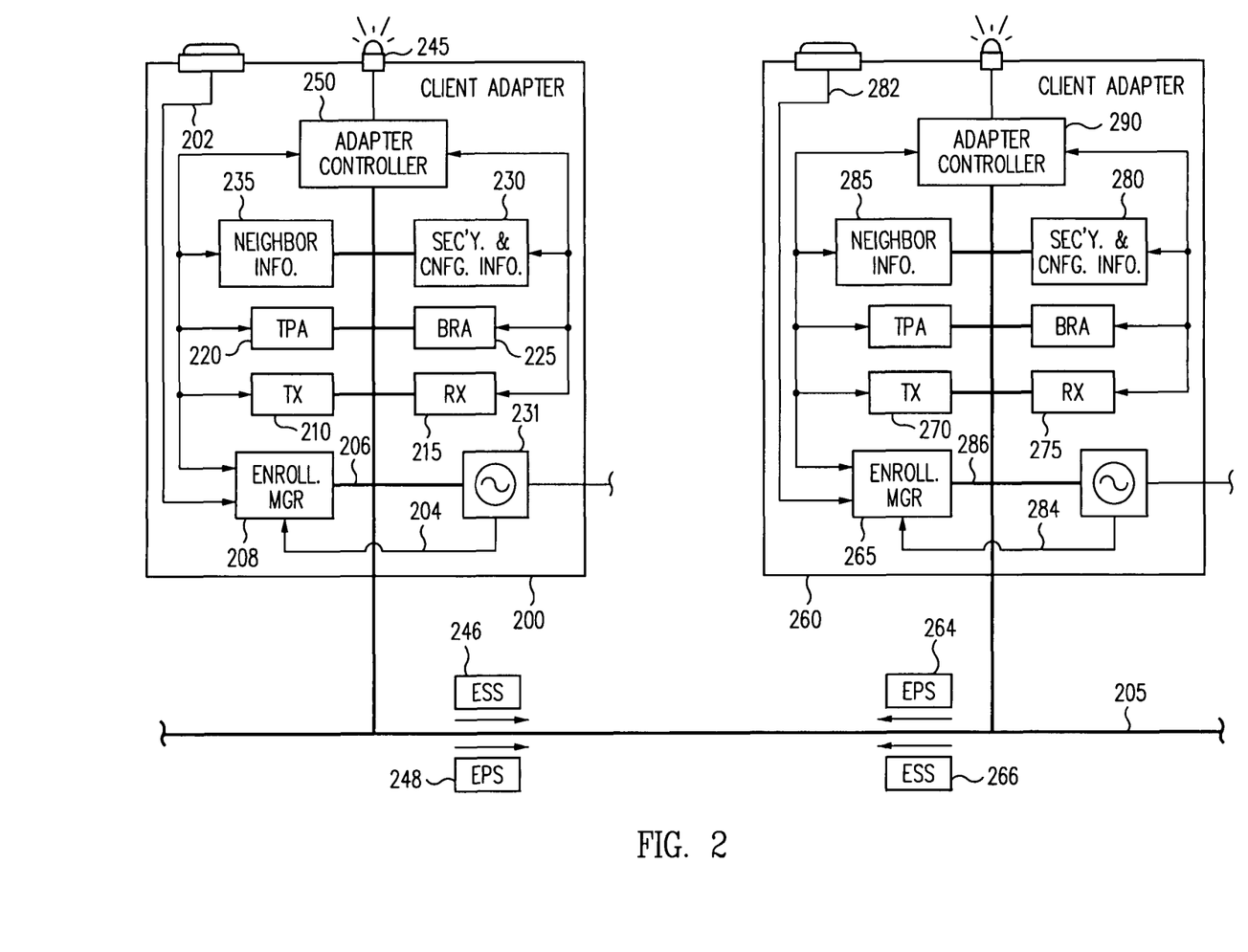
FIG. 2 is a block diagram of a first client adapter and a second client adapter each configured to be operable in accordance with embodiments of the present invention.

FIG. 2 illustrates an S3M client adapter 200, which exemplifies at least one of S3M client adapters 122, 124, 126, and which may be used as a client adapter on PEPN 120. In general, client adapter 200 can be coupled to EPN medium 205, can transmit signals over EPN medium 205 using transmit module (TX) 210, and can receive signals over EPN medium 205 using receive module (RX) 215. EPN medium 205 can be an S3M network transmission medium, as represented in FIG. 1 by PEPN 120. Adapter 200 can be configured to detect or to "listen" for other devices and adapters, which may signal on medium 205 and seek to communicate with adapter 200 for effecting neighbor security management, configuration, or both. Adapter 200 also includes adapter controller 250, which is coupled to, and configured to manage TX 210, RX 215, and enrollment manager 208.

Enrollment manager 208 can be configured to cause adapter 200 to function selectively as an enrollment provider or as an enrollment supplicant. Manager 208 may be configured to manage, generate, and interpret one or both of enrollment provider signals and enrollment supplier signals, and in response to a received activation command, to actuate adapter controller 250 to perform an enrollment service in cooperation with manager 208. Conveniently, manager 208 can be configured to implement a "two-button" security management service enrollment sequence as well as a "one button" security management service enrollment sequence. Enrollment manager 208 may receive an activation command from a manually-actuated security management service actuator, such as activation button 202, from a power state cycling signal 204, or from a software activation input 206 over shared medium 205. Enrollment manager 208 emits an enrollment command to adapter controller 250, responsive to the activation command. Responsive to the enrollment command adapter controller 250 manage an enrollment signal, which may include at least one of transmitting an outbound enrollment signal, or receiving an inbound enrollment signal. The enrollment signal can be one of an enrollment supplicant signal or an enrollment provider signal.

Software activation input 206 may be issued by a computer-based GUI (not shown) over shared medium 205. In the example of FIG. 2, client adapter 200 is powerline S3M client adapters, thus shared medium 205 also provides an electrical power signal to the respective host devices connected thereto (not shown). Power state sensor 231 may generate power cycling signal 204, in response to first client adapter 200 receiving a power cycling signal over medium 205. However, in implementations in which electrical power is not provided over shared medium 205, adapter 200 may employ a power state signal supplied by other means known in the art. Such a feature as power-cycling initiated enrollment can be beneficial for implementations of a client adapter, including first client adapter 200, in which the addition of a mechanical activation element, such as a button, switch, or lever, may be impractical, costly, or otherwise unsuitable. Also, this feature may be desirable for implementations where user-friendliness plays a prominent role in client adapter configuration, for example, where simplicity, reliability, error avoidance, and transparency are among the human interface design goal. For example, enrollment in response to power cycling signal 204 can reduce the complexity of network enrollment to a simple act of connecting a new device, including client adapter 200, to associated network transmission medium 205 and powering ON the new device. Moreover, to avoid the need to re-enroll a client adapter, such as client adapter 200, in response to inadvertent power cycles, it may be convenient to provide non-volatile memory capable of retaining enrollment information. Clearly, this greatly simplified enrollment method may be desirable to many consumers.

In general, adapter controller 250 also is configured to control the S3M security management services by managing and facilitating communication, configuration, and security services provided by S3M client adapter 200, including without limitation, selected service and data management, unauthorized device interrogation and recognition, power and signal connection control and maintenance. In cooperation with enrollment manager 208, controller 250 also may manage secure and appropriate exchange of stored S3M security management service information. Exemplary communication services include signal transmission, signal reception, power level and bit rate setting and adaptation, channel condition adaptation, signal filtering, signal identification and management, and the like, as known to skilled artisans. Exemplary configuration services can include OSI Layer 1-4 functions pertaining to physical-logical signal translation, device and adapter address management and control, inter- and intra-layer data direction, filtering, management, and control, and the like. Exemplary security services can include neighbor detection, recognition, rejection, access control, authentication, audit, and authorization.

For implementations, such as the present exemplary embodiments, in which selected client adapters are powerline networked devices, additional security management services may be provided by employing a piggyback networked device configuration mode to establish initial configuration for client adapters, such as client adapters 122, 124, 126. A piggyback mode may be beneficial, for example, when configuring one or more initial networked devices intended to connect to a powerline S3M network. After configuring these devices in a piggyback mode, it may be convenient to employ a client adapter in accordance with present embodiments implemented as powerline client adapters for subsequent enrollment security management services. An applicable implementation of secure configuration in a powerline piggyback configuration mode is described in co-pending, co-assigned, U.S. patent application Ser. No. 11/510,406, entitled, "APPARATUS AND METHOD FOR SECURE CONFIGURATION OF SHARED POWERLINE DEVICES," filed on Aug. 25, 2006, which U.S. Patent Application is incorporated herein in its entirety. Of course, presently described embodiments implemented as powerline client adapters are not restricted in any way to embodiments described therein. Indeed, presently described embodiments herein may be made and used for any suitable shared medium network, as well as for any suitable shared services, shared medium network.

Adapter 200 also may include one of both of transmitted power adapter 220 and transmitted bit rate adapter 225 in embodiments in which it is desirable for client adapter 200 to communicate over EPN medium 205 using a transmitted signals adaptation. Transmitted signals adaptation also may be used to confine the range of transmitted signals to a definable portion of EPN medium 205, including a neighborhood. One or more desirable implementation of transmitted signals adaptation, and one or more predetermined adaptation techniques are described in co-pending, co-assigned, U.S. patent application Ser. No. 11/510,159, entitled, "RANGE CONFINED COMMUNICATION APPARATUS AND METHOD," filed on Aug. 25, 2006, which U.S. Patent Application is incorporated herein in its entirety.

Adapter 200 can include first memory 230 which may be used to retain security and configuration information pertaining to adapter 200. Adapter 200 also may include second memory 235, which may be used to retain information pertaining to another client adapter, as well as to the network interconnected via medium 205. To facilitate data retention while adapter 200 is powered OFF, at least a portion of first memory 230 can be nonvolatile memory, and at least a portion of second memory 235 also may be nonvolatile memory storage. Moreover, adapter 200 may provide a perceptible indication of setup or configuration status, using interface device 245, here an LED responsive to adapter controller 250.

Second S3M client adapter 260 is illustrated as connected to shared medium 205 in order to illustrate examples of an enrollment service, as may be practiced, for example, during a "two button" enrollment or a "one-button" enrollment. Second client adapter is substantially the same as client adapter 200, and also is representative of S3M client adapters 122, 124, and 126 in FIG. 1. To facilitate illustration of the following examples, client adapter 200 is hereinafter designated first client adapter 200; client adapter 260 is hereinafter designated second client adapter 260. Similarly, the aforementioned elements of first client adapter 200 are hereinafter prefaced by the term "first," with corresponding elements of second client adapter 260 being prefaced by the term "second."

Conveniently, when both first client adapter 200 and second client adapter 260 are in an UNENROLLED state, each can recognize and authenticate each other, and be configured cooperatively to form a network using a "two-button" security management service activation sequence. In this example, each of respective first and second enrollment manager, 208, 265 receives a respective activation command from a respective activation source, such as activation button 202, 282; power cycling signal 204, 284; or software activation input 206, 286. In response, the respective enrollment manager 208, 265 each of client adapter 200 and 260 are activated and configured to enrollment security management services, which including an enrollment provider operation and an enrollment supplicant operation. Activation of adapter 200, 260 may be limited to a predetermined enrollment period, which may overlap to form a predetermined mutual opportunity window during which enrollment services are provided by both first and second first and second enrollment manager, 208, 265, including a mutual exchange of enrollment supplication signals and enrollment provider signals. Each of client adapters 200, 260 can follow the functional principles described relative to EXAMPLE 1 in that activation of first and second enrollment manager, 208, 265 can cause the transmission of first ESS 246 from first client adapter 200 through EPN medium 205 to second client adapter 260, and second ESS 266 from second client adapter 260 through EPN medium 205 to first client adapter 200. Each in response to the other, second client adapter 260 formulating and transmitting EPS 264 to first client adapter 200 responsive to first ESS 246, with first client adapter 200 formulating and transmitting second EPS 248 over EPN medium 205 responsive to second ESS 266. The mutual exchanges described herein may be characterized by a single supplicant-provider exchange by each adapter 200, 260, or by a predetermined series of exchanges representing negotiations between client adapters 200, 260. After enrollment provider security management service information is exchanged, each of client adapters 200, 260 may be reconfigured in accordance therewith, changing its status to being ENROLLED as an authorized networked device, for example, on PEPN 120.

In the following examples, enrollment is achieved using a "one-button" security management service security activation technique. The "button" may be a physical activation element, or a virtual activation element, such as an activation signal from a separate client adapter, GUI operating on a computer connected to medium 205, or hardware interrupt/fault processor. Example #1 illustrates enrollment initiated by an enrollment request transmitted by UNENROLLED first client adapter 200 made of an ENROLLED client adapter, e.g., client adapter 260. Example #2 illustrates enrollment of UNENROLLED first client adapter 200 as an authorized device on a network in response to a enrollment solicitation initiated by ENROLLED second client adapter 260;

Example 1

"One-Button Request" by Unenrolled First Client Adapter

Enrollment can be accomplished by a "one-button enrollment request" initiated by UNENROLLED first client adapter 200, in which at least one ENROLLED client adapter, e.g., client adapter 260, is connected to transmission medium 205, and is capable of acting as an enrollment provider. First enrollment manager 208 of UNENROLLED first client adapter 200 can receive an activation command from an activation source, such as first activation button 202, first power cycling signal 204, or first software activation input 206. That is, client adapter 200 is activated by, for example, by a single button press, to seek an ENROLLED client adapter, such as adapter 260, and to be authenticated as an authorized device on the corresponding network. In response, first enrollment manager 208 cooperates with first adapter controller 250 to form enrollment supplicant signal (ESS) 246, using information stored in one or both of first memory 230 and second memory 235. First enrollment manager 208 then actuates first adapter controller 250 to transmit ESS 246 using TX 210. Upon transmission of ESS 246 into medium 205, first client adapter 200 identifies itself as a supplicant device. Being connected to shared medium 205, ENROLLED second client adapter 260 detects ESS 246 and, for purposes of the present example, recognizes ESS 246 as emanating from a supplicant device for which adapter 260 may serve as an enrollment provider. By receiving ESS 246 as an enrollment provider, ENROLLED second client adapter 260 identifies itself as an authenticating device.

Second adapter controller 290 directs second RX 275 to pass ESS 246 to second enrollment manager 265. Second enrollment manager 265 parses and evaluates ESS 246 to determine whether UNENROLLED first client adapter 200 is an approved device. If first client adapter 200 is not an approved device, ENROLLED second client adapter 260 may not respond, and may save all or part of information in ESS 246, which may be used to identify and manage unauthorized devices. If first client adapter 200 is an approved device, then second enrollment manager 265 formulates enrollment provider signal (EPS) 264. Otherwise, second enrollment manager 265 may reject the enrollment solicitation or may ignore further input from first client adapter 200. EPS 264 may include data of one of both adapter configuration security management service information and security setup security management service information. EPS 264 also may include security management service policy information, which may be stored in memory devices 280, 285. EPS 264 also may be a simple predetermined signal, which may initiate a series of exchanges between enrollment provider and enrollment supplicant, in effectuation of selected security management services. Second TX 250 is directed by second adapter controller 290 to transmit EPS 264 over shared medium 205.

UNENROLLED first client adapter 200 detects, recognizes, and receives EPS 264 in first RX 215 which, as directed by first adapter controller 250, transfers EPS 264 to first enrollment manager 208. Responsive to EPS 264, first enrollment manager 208 may cooperate with first client adapter 250 to reconfigure first client adapter 200 as an ENROLLED device. In general, the foregoing illustrates a "one button"-type of security management service enrollment sequence, requested by an UNENROLLED networked device.

Example 2

"One-Button Solicitation" by Enrolled Second Client Adapter

Enrollment of unenrolled first client adapter 200 as an authorized device on a network may be initiated in response to an enrollment solicitation by an ENROLLED device, e.g., second client adapter 260. Conveniently, software activation input 206 to UNENROLLED first client adapter 200 also may be provided by ENROLLED second client adapter 260, responsive to an activation command generated by second enrollment manager 265. This type of single-button activation may be designated "one-button solicitation." Enrollment activation of UNENROLLED client adapter 200 by an ENROLLED client adapter 260 may be advantageous, for example, where it is desired to poll the networked devices connected to EPN medium 205 for new never-enrolled devices, for previously ENROLLED devices, and to initiate re-enrollment for devices which may have become UNENROLLED, for example, to a security management service policy modification or upgrade. Such activation may be in response to an EPN operator action, e.g., a "one-button" type of security management service enrollment sequence or may be performed on a recurrent basis by one or more ENROLLED client adapters connected to EPN medium 205. In the former embodiment, ENROLLED adapter 260 may transmit an enrollment solicitation seeking to enroll all UNENROLLED devices connected to EPN medium 205. Enrollment may be limited to a defined activation period, i.e., ENROLLED client adapter 260 may perform "all-in-one" enrollment solicitation within a defined enrollment opportunity window. In an "all-in-one" enrollment solicitation, ENROLLED client adapter 260 may queue incoming enrollment supplicant signals from UNENROLLED client adapters (e.g., client adapter 200) responding to the solicitation. ENROLLED client adapter 260 may process the enrollment supplication requests and provide respective enrollment provider signals, in the order they were received, or may grant enrollment in accordance with a predetermined priority technique, including by a defined adjacency or neighborhood. In one alternative aspect, after the defined activation period, however, no UNENROLLED device can be enrolled without additional EPN operator action. Such restriction may be a desirable counter factor to additional conveniences that may be gained from the "all-in-one" enrollment solicitation feature. Alternatively, a single button press of ENROLLED second client adapter 260 may allow for enrollment of only one UNENROLLED client adapter, e.g., first client adapter 200.

In this Example #2, first enrollment manager 208 of UNENROLLED first client adapter 200 can receive an activation command in the form of an enrollment solicitation from ENROLLED second client adapter 260. Here, the activation command for first enrollment manager 208 is received via first software activation input 206. Solicitation by ENROLLED second client adapter 260 can be initiated by an activation command to second enrollment manager 265, responsive to user manipulation of second activation button 282. That is, second client adapter 260 is activated by, for example, by a single button press of button 282, to seek, and to solicit an enrollment request from, an UNENROLLED client adapter, such as first client adapter 200. For the most part, first client adapter 200 and second client adapter 260 cooperate as described with respect to Example #1, above. For example, in response to the solicitation by second client adapter 260, first enrollment manager 208 cooperates with first adapter controller 250 to form and to transmit enrollment supplicant signal (ESS) 246 into medium 205. ENROLLED second client adapter 260 receives parses and evaluates ESS 246 from UNENROLLED first client adapter 200, to determine whether UNENROLLED first client adapter 200 is an approved device. If it is, then second enrollment manager 265 formulates and transmits enrollment provider signal (EPS) 264 into medium 205, to be received by UNENROLLED first client adapter 200. Responsive to received EPS 264, first enrollment manager 208 may cooperate with first client adapter 250 to reconfigure first client adapter 200 as an ENROLLED device. In general, the foregoing illustrates a "one button"-type of security management service enrollment sequence, solicited by an ENROLLED networked device.

Example 3

Prior Enrolled First Client Adapter—Guest Access

Another embodiment of a "one-button" security management service enrollment sequence includes an enrollment operation in which a currently UNENROLLED first client adapter 200 seeks to become enrolled, having previously been identified as an ENROLLED client adapter. This feature can be described as a form of "Guest Access" to a network, such as PEPN 120, and previously-ENROLLED client adapter 200 can be designated as a Guest. Guest access enrollment may be useful for ad hoc, temporary, or occasional recurring connections of a host device, including client adapter 200 to a shared medium network. Although such re-enrollment may be responsive to a power cycling signal such as signal 204 while being connected to the network and activated, Guest Access re-enrollment is not activated in general, for example, by a power outage. In this example, when first client adapter 200 is reconnected to shared medium 205, first enrollment manager 208 may recognize that first client adapter 200 was ENROLLED previously on the EPN using shared medium 205, e.g., PEPN 120 in FIG. 1. In cooperation with first adapter controller 250, first enrollment manager 208 formulates ESS 246, after which first adapter controller 250 causes first TX 210 to transmit ESS 246 into shared medium 205.

Advantageously, a client adapter 200, 260 may be disposed with a secret key (not shown), for example when initially configured, or upon an enrollment. The secret key also may be provided by a manufacturer or vendor of the client adapter. In selected embodiments, ESS 246 may be representative of, or bear at least a portion of, a secret key securely held in memory 230, 235 by first client adapter 200. Upon recognizing ESS 246 as emanating from a SD, second client adapter 260 processes ESS 246, and in response, formulates EPS 266. EPS 266 is transmitted into EPN medium 205, from which it is sensed and received by first client adapter 200. In a manner similar to the Examples, above, first enrollment manager 208 can cooperate with first adapter controller 250 to conform first client adapter 200 to security management service information which may have been represented in EPS 264. Accordingly, GUEST first client adapter 200 can update its status to ENROLLED, and can be authorized to communicate with other ENROLLED client adapters across EPN medium 205. Alternatively, in embodiments where a representation, or at least a portion of, a secret key is presented to ENROLLED second client adapter 260 by GUEST first client adapter 200, an expedited or express enrollment security management service may be performed, in which the GUEST first client adapter 200 is recognized by ENROLLED second client adapter 260 to already possess sufficient current security management service information to be configured as an ENROLLED client adapter, and avoiding duplicative security management service information exchange.

A variety of hardware and software functions have been described herein. Depending upon the implementation, many of the hardware functions may be emulated using software. Likewise, software functions may be performed using hardware components having hardwired circuitry; and some of the hardware or software functions may be configured using alternative technologies known to skilled artisans, including without limitation, firmware and application specific integrated circuits. The elements in the Figures are to be taken as logical and thus, can be implemented in a consolidated or distributed manner to achieve a desired result.

Moreover, many alterations and modifications may be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the ideas of the invention.

The invention claimed is:

1. A network adapter, comprising:
an enrollment manager, configured to receive an activation command from an activation source and configured to emit an enrollment command in response thereto; and
a hardware adapter controller connected to the enrollment manager to receive the enrollment command and configured to manage an enrollment signal in response thereto,
wherein the enrollment signal can be both an OUTBOUND enrollment signal or an INBOUND enrollment signal;
wherein each of the OUTBOUND enrollment signal and the INBOUND enrollment signal can be both an enrollment provider signal or an enrollment supplicant signal;
wherein the adapter controller transmits an OUTBOUND enrollment signal and receives an INBOUND enrollment signal;
wherein at least one of the enrollment manager and the adapter controller changes a network adapter configuration in accordance with an INBOUND enrollment signal; and
wherein the network adapter effectuates a secure communication across a shared medium network in response to the network adapter configuration.

2. The network adapter of claim 1, wherein the network adapter configuration is an UNENROLLED state, wherein the OUTBOUND enrollment signal is an enrollment supplicant signal, wherein the INBOUND enrollment signal is an enrollment provider signal comprising a security management service information, and wherein the network adapter configuration is changed to an ENROLLED in accordance with the security management service information.

3. The network adapter of claim 1, wherein the network adapter configuration is an ENROLLED state, wherein the activation command is the INBOUND enrollment signal, wherein the INBOUND enrollment signal is an enrollment supplicant signal, and wherein the OUTBOUND enrollment signal is an enrollment provider signal comprising a security management service information.

4. The network adapter of claim 1, wherein the activation command comprises a one-button security management service enrollment sequence.

5. A method of configuring a network adapter, comprising:
receiving by an enrollment manager of the network adapter an activation command from an enrolled network adapter the same as the network adapter;
generating by the enrollment manager an enrollment supplicant signal in response to the activation command;
managing by an adapter controller connected to the enrollment manager the enrollment supplicant signal;
transmitting the enrollment supplicant signal to the enrolled network adapter;
receiving an enrollment provider signal from the enrolled network adapter, wherein the enrollment provider signal includes a security management service information; and
configuring a network adapter in conformance with the security management service information, wherein the network adapter responds to configuring the network adapter by communicating securely across a shared medium.

6. The method of claim 5, further comprising:
receiving an enrollment supplicant signal;
formulating an enrollment provider signal to include the security management service information, responsive to the enrollment supplicant signal; and
transmitting the enrollment provider signal to effectuate configuring the network adapter, wherein the network adapter responds to configuring the network adapter by communicating securely across a shared medium.

7. The network adapter of claim 1, wherein the network adapter operates within a customer premises.

8. The network adapter of claim 1, wherein the network adapter operates with at least one of an Ethernet network, a powerline network, a phone-line network, or a cable network.

9. The network adapter of claim 1, wherein the network adapter is configurable for being integrated in a host device.

10. The network adapter of claim 3, wherein the network adapter is operable to accept or deny signals communicated by an UNENROLLED network device.

11. The method of claim 5, further comprising establishing a defined neighborhood among a plurality of client adapters.

12. The method of claim 11, further comprising designating a further client adapter disposed in the defined neighborhood as a neighbor to the plurality of client adapters.

13. The method of claim 11, further comprising offering by the enrollment provider information regarding additional networked devices that co-exist in the neighborhood.

14. The method of claim 11, further comprising offering by the enrollment provider information regarding additional networked devices that perform specific security management services.

15. A network adapter, comprising:
an enrollment manager, configured to receive an activation command from an activation source and configured to emit an enrollment command in response thereto; and
a hardware adapter controller connected to the enrollment manager to receive the enrollment command and configured to manage an enrollment signal in response thereto,
wherein the enrollment signal can be both an OUTBOUND enrollment signal or an INBOUND enrollment signal;
wherein each of the OUTBOUND enrollment signal and the INBOUND enrollment signal can be both an enrollment provider signal or an enrollment supplicant signal;
wherein the adapter controller transmits an OUTBOUND enrollment signal and receives an INBOUND enrollment signal;
wherein at least one of the enrollment manager and the adapter controller changes an network adapter configuration in accordance with an INBOUND enrollment signal;
wherein the network adapter effectuates a secure communication across a shared medium network in response to the network adapter configuration; and
wherein the activation command is received by the enrollment manager from one of an actuator, a power state cycling signal, and activation input over a shared medium.

16. The network adapter of claim 15, wherein the actuator includes an activation button that is manually actuated.

17. The network adapter of claim 15, wherein the activation input over the shared medium includes a software activation input.

18. The network adapter of claim 15, wherein the software activation input may be issued by a computer based graphic user interface over the shared medium.

19. The network adapter of claim 15, further including a transmitted power adapter.

20. The network adapter of claim 15, further including a transmitted bit rate adapter.

* * * * *